(12) United States Patent
Panjwani et al.

(10) Patent No.: US 6,928,149 B1
(45) Date of Patent: Aug. 9, 2005

(54) METHOD AND APPARATUS FOR A USER CONTROLLED VOICEMAIL MANAGEMENT SYSTEM

(75) Inventors: Mahmood Panjwani, Hillsborough, CA (US); Yasmeen Noor Ali, Hillsborough, CA (US); Shamshad Rashid, Hillsborough, CA (US); Rafiq Mohammadi, Chicago, IL (US); Zia Bhatti, Chicago, IL (US); Neil Araujo, Evanston, IL (US)

(73) Assignee: Interwoven, Inc., Sunnyvale, CA (US)

( * ) Notice: Subject to any disclaimer, the term of this patent is extended or adjusted under 35 U.S.C. 154(b) by 0 days.

(21) Appl. No.: 09/312,926

(22) Filed: May 17, 1999

(51) Int. Cl.[7] .............................................. H04M 1/64
(52) U.S. Cl. ................. 379/88.25; 379/88.18; 379/88.17; 379/88.12
(58) Field of Search .................. 379/88.23, 88.25, 379/88.26, 88.18, 88.17, 88.12, 67.1, 68, 88.13, 88.22

(56) References Cited

U.S. PATENT DOCUMENTS

| | | | | |
|---|---|---|---|---|
| 5,647,002 A | * | 7/1997 | Brunson | 709/206 |
| 5,659,599 A | * | 8/1997 | Arumainayagam et al. | 379/67.1 |
| 5,675,507 A | * | 10/1997 | Bobo, II | 702/113 |
| 6,115,455 A | * | 9/2000 | Picard | 379/67.1 |
| 6,233,318 B1 | * | 5/2001 | Picard et al. | 379/88.17 |
| 6,522,727 B1 | * | 2/2003 | Jones | 379/88.23 |

* cited by examiner

*Primary Examiner*—Fan Tsang
*Assistant Examiner*—S. P. Sing
(74) *Attorney, Agent, or Firm*—Glenn Patent Group; Michael A. Glenn (57) ABSTRACT

A method and apparatus for a user controlled voicemail management system (UCVMS) is provided. The UCVMS includes a first interface for interfacing with a voice mail provider, the first interface for receiving a voicemail message from the voice mail provider, the voice mail message including an owner identification. The UCVMS further includes a repository for storing the voicemail message, the repository being accessible only to the owner by using the owner identification.

5 Claims, 5 Drawing Sheets

METHOD AND APPARATUS FOR A USER CONTROLLED VOICEMAIL MANAGEMENT SYSTEM

FIELD OF THE INVENTION

The present invention relates to user data storage, and more specifically, a user controlled voice mail management system.

BACKGROUND

Voice mail services provided by a telephone company are becoming an alternative to traditional answering machines. Such voicemail systems enable someone to leave a when the user is on the telephone, online, or away from home. Voice mail messages can be retrieved from any touch-tone telephone. Such voicemail systems are advantageous because of such features as extension mailboxes that give individuals in shared households their own private mailbox, the chance to leave messages for other voicemail system users without ringing their phone, and pager notification that alerts the users of new messages. Generally, the voicemail system is protected by a password. When the user dials into the voicemail system, he or she is prompted for a password, and if the password is correct, is transferred to a menu.

However, the data in the user's voicemail box is controlled by the telephone company. Generally, telephone companies have a deletion policy that deletes old voicemail messages after fifteen or thirty days. This is a considerable space saving for the telephone company. However, in some instances, a user may wish to save a voicemail message for a longer period of time. This is not possible with today's voicemail systems.

SUMMARY OF THE INVENTION

A method and apparatus for a user controlled voicemail management system is described. The UCVMS includes a first interface for interfacing with a telephone based voice mail provider, the first interface for receiving a voicemail message from the voice mail provider, the voice mail message including an owner identification. The UCVMS further includes a repository for storing the voicemail message, the repository being accessible only to the owner by using the owner identification.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A user-controlled voicemail management system is described. Voicemail messages can be forwarded by the user from a voicemail system administered by a telephone company, corporation, or other entity. The voicemail management system receives the voicemails, stores them in a location accessible to the user. For one embodiment, the voicemail management system is accessible using the user's voicemail password.

Figure 1:
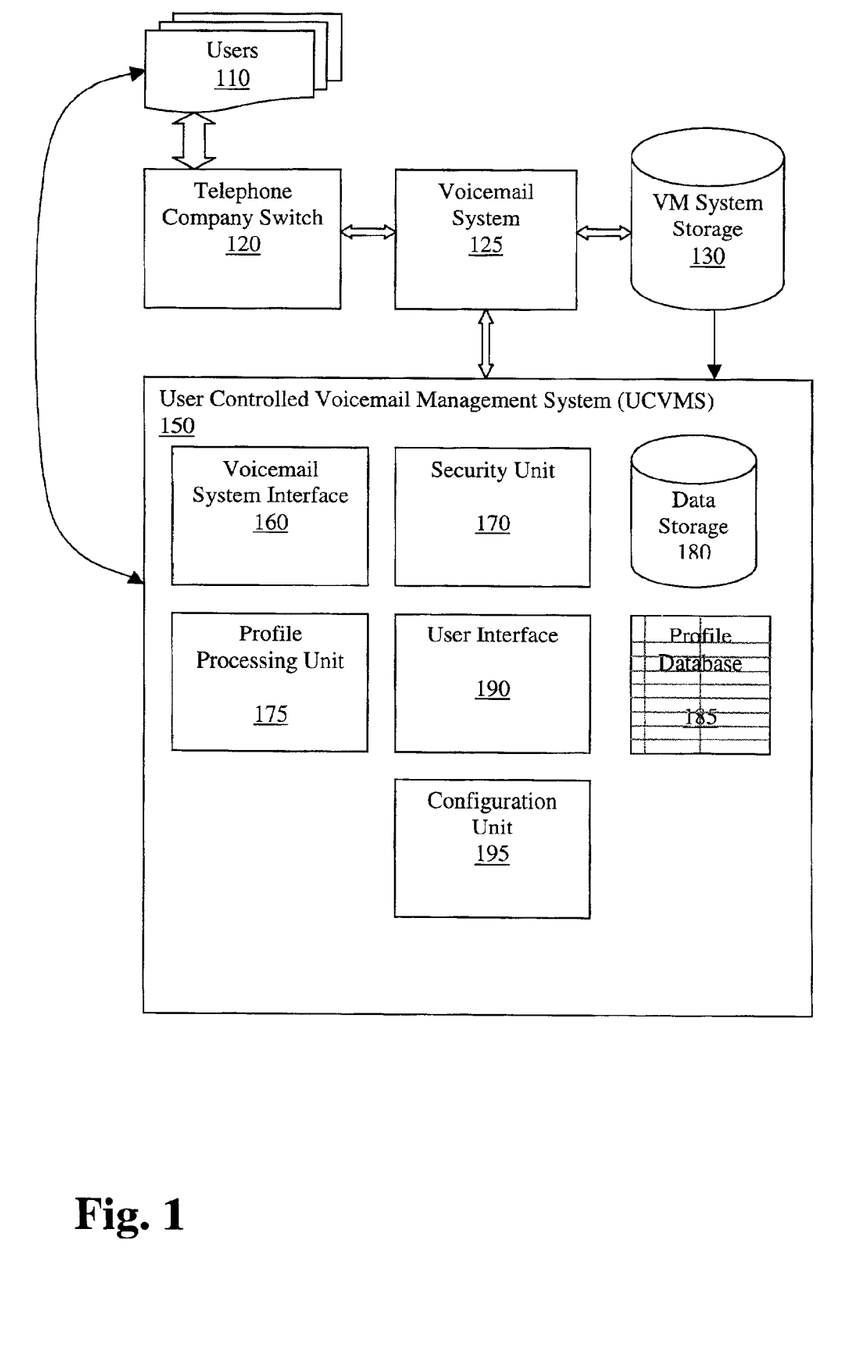
FIG. 1 is a block diagram of one embodiment of the system.

FIG. 1 is a block diagram of one embodiment of the system. Users 110 have a connection a telephone company switch 120, in order to make telephone calls, or access the telephone company provided voicemail system 125. The voicemail system 125 stores voicemails received by the user in VM system storage 130, and may provide a variety of services to the user. However, the voicemail system 125 is controlled by the telephone company, and automatically erases messages after a preset number of days.

The user 110 may forward voicemail messages from the VM system storage 130 to the user controlled voicemail management system (UCVMS) 150. The user can indicate that he or she wishes to forward a message to the UCVMS 150, while in the voicemail system 125. For one embodiment, there is a dedicated key for forwarding to the UCVMS 150. For another embodiment, the UCVMS 150 is a known forwarding location, such that the user can select the forward option, and then select the UCVMS' 150 address. For one embodiment, the option to send the voicemail message to the UCVMS 150 is listed in the options menu of the voicemail system 125. For another embodiment, the user may preset that all new voicemail messages are forwarded to the UCVMS 150. For one embodiment, this is accomplished by establishing a relationship between the voicemail system 125 provider, and the UCVMS 150 provider.

When the message is forwarded to the UCVMS 150, the VM system 125 interfaces with the voicemail interface 160 of the UCVMS 150. For one embodiment, the VM system 125 has a standard Application Program Interface (API). The voicemail interface 160 interfaces with the voicemail system 125 using this API, to receive the user's voicemail message (s) from the VM system storage 130. For one embodiment, the voicemails transmitted by the VM system 125 are compressed for transmission. For another embodiment, the voicemails are compressed and encrypted, to minimize bandwidth and provide additional security.

Of course, this system may be used with a non-telephone company voice mail system, such as a corporate voicemail system. In that instance, instead of a telephone company switch, the user directly deals with the voicemail system 125.

For one embodiment, the voicemail interface 160 includes a plurality of APIs to interface with different voicemail systems. For one embodiment, the voicemail interface 160 receives the voicemail message from the voicemail system 125 encoded with the user's password. For one embodiment, the voicemail message received includes the user's telephone number and the user's password. For one embodiment, the user's password encrypts the voicemail message, such that third parties can not access the voicemail message.

The voicemail interface 160 forwards the voicemail message to the security unit 170, and forwards the user's telephone number to the user interface 190. The security unit 170 encodes the voicemail message with the user's password, if this was not done previously. The security unit 170 then stores the voicemail message in the data storage 180. The data storage 180 is a repository for information in the UCVMS 150. For one embodiment, the data storage 180 is a database, which stores each voicemail message encrypted, and associated with the recipient's (i.e. user's) telephone number.

The profile processing unit 175 extracts profile information from the voicemail message. The profile information may include all of the available information about the voicemail message. For one embodiment, the elements of the default profile are: call recipient (i.e. user), call originator, originator's telephone number, date and time of message, length of message, date and time message was stored, any additional notes from the user.

For one embodiment, a default profile is generated automatically when the voicemail message is received. For one embodiment, the user may change this default profile. For one embodiment, the user may change the items in the profile as well, by adding or deleting items. The user may further create categories that may be added to the message. For example, the user may create a category such as message type, classifying messages as either business or personal. Other profile items may be added.

The profile processing unit 175 stores the profile, which is linked to the actual message, in the profile database 185. For one embodiment, the profile points to the actual message in the data storage 180. The profile processing unit 175 also searches stored profiles, to quickly locate a message.

The user interface 190, based on the telephone number of the user, adds the new voicemail message to the user's account. For one embodiment, as described below with respect to FIG. 2, the user interface 190 also establishes an area for a new user, if there is no area corresponding to the user's telephone number. The user interface 190 further permits the user to manipulate the voicemails. For one embodiment, the voicemails played by the user are played in streaming audio format, reducing lag time.

Figure 4:
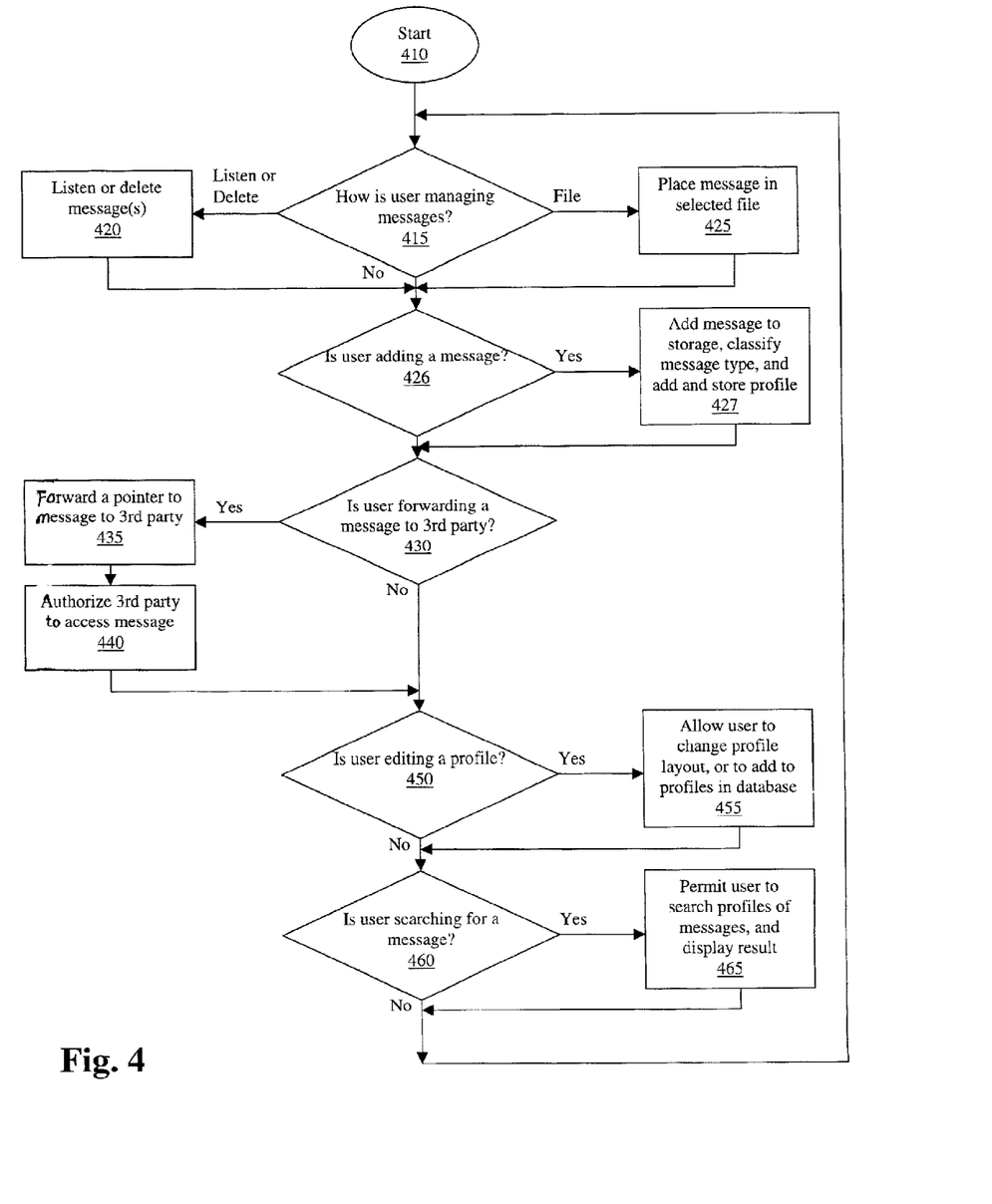
FIG. 4 is a flowchart of one embodiment of manipulating messages in the voicemail management system.

The configuration unit 195 permits a user to configure the user interface display. One embodiment of the user interface is illustrated in FIG. 4. Each of the elements of the user interface is variable. For one embodiment, the only consistent features of the user interface are a display of the user's voicemail messages. In this way, a user gets a highly personalized area that permits him or her to save voicemails indefinitely in a private area, which is controlled by the user.

For one embodiment, the configuration unit 195 further adds selected advertising, links, or other materials to the user interface. The addition of such materials is known in the art. For one embodiment, this type of materials may be displayed only if the user is not a subscriber, or is if the user is generating income below a minimum threshold.

Figure 2:
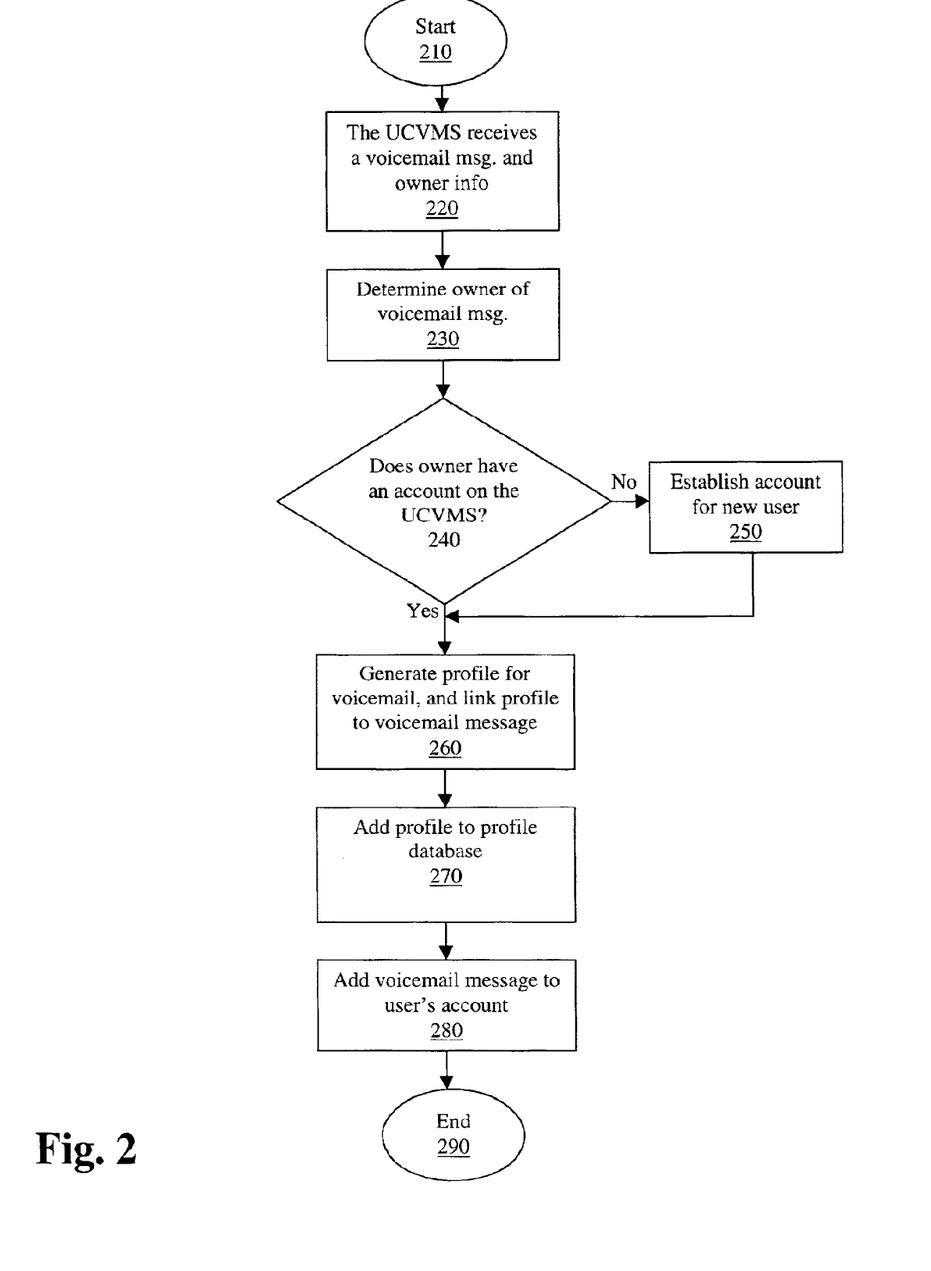
FIG. 2 is a flowchart of one embodiment of storing a voicemail in the voicemail management system.

FIG. 2 is a flowchart of one embodiment of storing a voicemail in the voicemail management system. The process starts at block 210.

At block 220, a voicemail message is received by the UCVMS. As described above, for one embodiment, this occurs in response to a user pressing a certain key or key combination while accessing a voicemail system. For one embodiment, this may occur if the user forwards a voicemail message to the number of the UCVMS 150. For yet another embodiment, the voicemail system may automatically forward a message to the UCVMS 150, as preset by a user.

The voicemail message, for one embodiment, includes the audio portion of the voicemail message, which may be compressed, and the owner identification information. For one embodiment, the owner identification comprises a telephone number of the owner, and the voicemail password of the owner.

At block 230, the process determines the owner of the voicemail message. For one embodiment, the telephone number of voicemail recipient is assumed to be the owner of the voicemail message. For another embodiment, if the voicemail system includes multiple boxes, the box number is used in addition to the telephone number to determine the owner of the voicemail. For one embodiment, the system further determines a name or other identity of the owner of the voicemail system, in addition to determining the number.

At block 240, the process determines whether the owner has an account on the UCVMS system. For one embodiment, the process determines if there are any prior voicemail messages stored for the same owner. If the owner has an account, the process continues directly to block 260. Otherwise, the process continues to block 250.

At block 250, an account is established for the user. For one embodiment, this includes generating a standard user interface, and enabling log-in. For one embodiment, the standard user interface includes advertising and links. For another embodiment, the standard user interface, automatically established when the first voicemail message is received, only includes the pointer to the voicemail message in the data storage. The process then continues to block 260.

At block 260, a profile is generated. For one embodiment, the profile includes all of the available information about the voicemail message. The profile, for one embodiment, uses the profile format of the owner of the voicemail message. For another embodiment, a default profile form is used. The profile includes a link or pointer to the voicemail message. The profile is the searchable portion of the voicemail message.

At block 270, the profile is added to a profile database.

At block 280, the voicemail message is added to the user's account. As discussed above, for one embodiment, this consists of a simple pointer. For another embodiment, the system attempts to determine other information about the voicemail, such as originating telephone number, time and date sent, time and date forwarded to the UCVMS, etc, and this information is also included. For one embodiment, the system attempts to determine the originator of the voicemail message, by using the originating telephone number, and attempting to match that using a white pages or similar database, and displays this information as well.

For one embodiment, the above steps, of determining whether an owner has an account, creating an account, and adding the voicemail message to the account are not performed in response to receiving a voicemail message, but are preformed in response to an attempted log-in by a user.

At block 290, the process ends.

Figure 3:
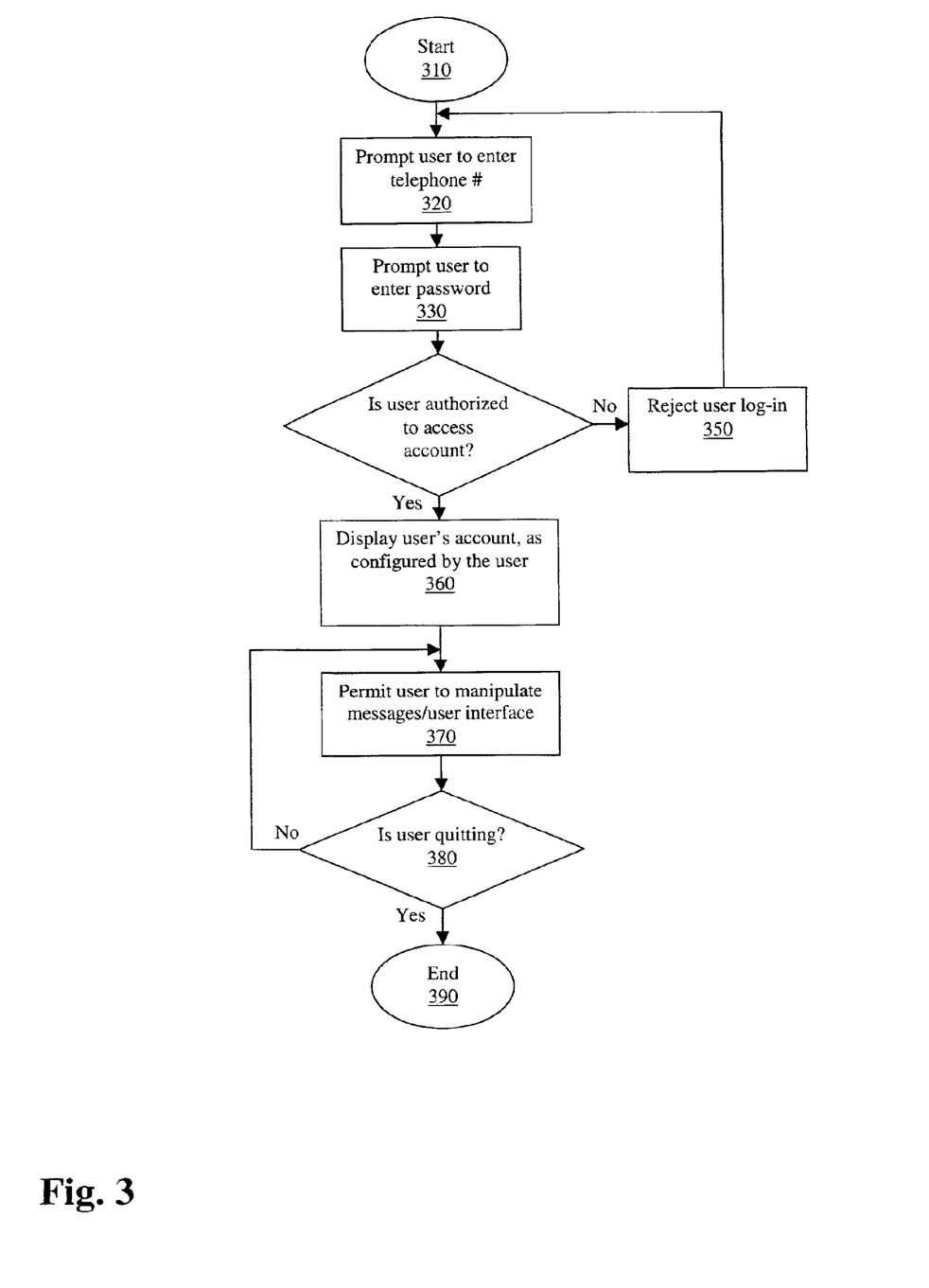
FIG. 3 is a flowchart of one embodiment of accessing the voicemail management system.

FIG. 3 is a flowchart of one embodiment of accessing and using the voicemail management system. At block 310, the process starts.

At block 320, the user is prompted to enter his or her telephone number. For one embodiment, if the user has a mailbox number or extension number, he or she is prompted to enter that as well. The telephone number is the equivalent of a user ID, or handle. It identifies the user.

At block 330, the user is prompted to enter his or her password. For one embodiment, this password is the same as the user's voicemail password. For another embodiment, this password may be changed by the user.

At block 340, the process determines whether the user is authorized to access the account. If the telephone number and password match, the user can access the voicemail messages and account associated with that identification information. If the user is not authorized, the process continues to block 350, and the user's log-in attempt is rejected.

The process then returns to block 320, prompting the user to enter his or her telephone number. If the user is authorized, the process continues to block 360.

At block 360, the user's account is displayed. For one embodiment, this is the default layout. Alternatively, if the user has altered the layout, the new layout, customized by the user, is displayed. For one embodiment, the user's account includes pointers to voicemail messages stored in data storage.

At block 370, the user manipulates the messages and/or the user interface. The user interface may be changed by adding other information to be displayed in the user's account, such as e-mail accounts, faxes, other documents, etc. Furthermore, the user interface may be automatically changed by the configuration unit to display advertising or other information. The user can further manipulate the messages stored in the data storage. For example, the user can add notes to a message, add a name, or otherwise alter the message. Furthermore, the user can forward the message to others. This is illustrated in more detail in FIGS. 4A and 4B.

At block 380, the process determines whether the user wishes to exit the system. If the user wishes to exit, the process ends at block 390. Otherwise, the process returns to block 370.

FIG. 4 is a flowchart of one embodiment of manipulating the voicemails in the voicemail management system. The process starts at block 410. For one embodiment, the list of processes shown below is not performed linearly. Rather, the user, by pressing a key or clicking on an icon, may indicate that he or she wishes to perform a particular task. The process then automatically jumps to that particular portion of this flowchart. For one embodiment, this is an interrupt driven process, with different types of interrupts corresponding to the different types of tasks that the user may perform.

At block 415, the process determines whether the user is managing voicemail messages, and if yes, what type of managing the user is doing. If the user is not managing voicemail messages, the process continues directly to block 426.

If the user is listening to a message, or deleting a message, the process continues to block 420, where the message is played or deleted, respectively. For one embodiment, if the user is listening to a message, the message is played in a streaming audio format. For one embodiment, the streaming audio format is Progressive Network's RealAudio format.

For one embodiment, if a message is being erased that has a profile, the profile is automatically deleted as well. For one embodiment, deleting a message requires a confirmation. The process then continues to block 426.

If the user chooses to file a message, the process continues to block 425, where the user is permitted to place the message in any file. For one embodiment, the user is permitted to create a new file during this process. The process then continues to block 426.

At block 426, the process detects if the user is attempting to add a message. The term message in this instance refers to data, of various types. For example, the message may be a recorded conversation, an e-mail message, fax, scanned document, photograph, video, or other form of data that may be added into the message system. For one embodiment, once a user is comfortable storing voicemail messages, he or she may add other personal documents that he or she wishes to securely save on a server. For one embodiment, the data type is irrelevant. If the data type can be transferred into a computer by some means, the user may add it to the message system. If the user is attempting to add a message, the process continues to block 427, otherwise, the process goes directly to block 430.

At block 427, the message is added to the storage repository. For one embodiment, the message may be automatically classified by the system, based on the message type. For one embodiment, this classification determines where the message is filed. For another embodiment, the message is not classified, and the user is prompted to file the message in any folder. A profile is generated for the message, including all of the deducible data, and a pointer to the message in the repository. For one embodiment, the user is able to add to the profile, or change the profile format. For one embodiment, different profile formats may be used for different types of messages. The profile is stored in the profile database. As discussed above, the profiles are indexed, permitting fast search of all message profiles. The process then continues to block 430.

For one embodiment, at block 430, the process detects if the user is forwarding the message to a third party. If the user is not forwarding, the process continues to block 450, otherwise, the process continues to block 435.

At block 435, the process forwards a pointer to the message in the data storage to the third party, instead of the entire message. This saves space and network traffic, especially since voice messages are generally rather large.

At block 440, the third party is authorized to access the message in the user's data storage. For one embodiment, the third parties are added to the data storage 180, as persons authorized to access the particular voicemail message forwarded to them. For one embodiment, the user can revoke this authorization. For one embodiment, a temporary identification is created to allow the third party to access the voicemail message, since generally, third parties can not access private messages. For yet another embodiment, blocks 435, and 440 may be skipped entirely, and the voicemail message may be conventionally forwarded. The process then continues to block 450.

At block 450, the process determines whether the user is changing a profile. For one embodiment, the profile format is configurable by the user. For another embodiment, a preset profile format may be used. If the user is editing a profile, the process, at 455, permits the user to change the profile configuration for this message, for all messages of a certain type, or for all messages. The user can also edit profiles of individual messages.

At block 460, the process determines whether the user is searching for a message. As discussed above, a user may maintain a large file of voicemail messages, e-mail messages, faxes, or other document types. These messages are searchable. If the user is searching for a message, at block 465, the user is permitted to search profiles of messages, and a result of the search is displayed to the user. The process then returns to block 415.

Figure 5:
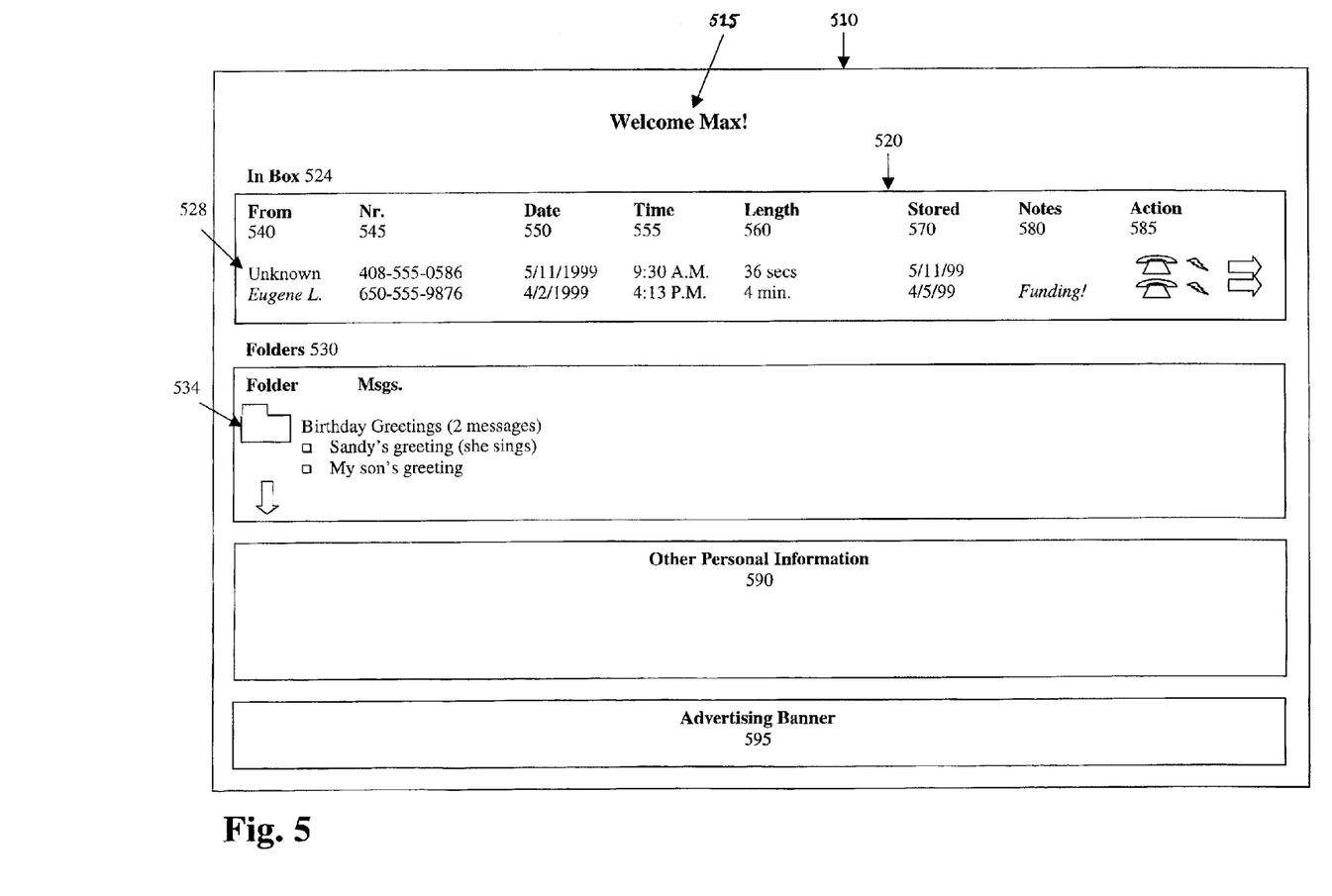
FIG. 5 is an illustration of one embodiment of the user interface of the voicemail management system.

FIG. 5 is an illustration of one embodiment of the user interface of the voicemail management system. The user interface 510, for one embodiment, is a frame within a browser.

The user interface 510 may include a personal greeting 515, identifying the user. For one embodiment, this may be edited by the user, to a preferred nickname, or something else. For yet another embodiment, this may be the telephone number of the user.

The user interface 510 further may include a voicemail list 520. The voicemail list 520 may include an inbox 524, listing the profiles of voicemail messages that have not been filed in a folder. The Actions 585 show examples of actions that may be taken with the voicemails. The telephone, for example, represents listening to the voicemail, while the lightning represents forwarding the voicemail to a third party, and the arrow represents filing the message. Of course, other actions may also be taken, and other symbols may be used.

One or more of the following data is included in the profile of each message: From 540, the telephone number 545, the date 550 and time 555 when the voicemail was left, the length of the message 560, the date the message was stored in the UCVMS 570, and/or notes 580 added by the user. For one embodiment, subset of this group may be displayed, or a different set of data may be displayed about each voicemail 535. For one embodiment, the user may change the contents and/or the format of the profile.

For one embodiment, the user may edit each of these fields. For yet another embodiment, something, such as italics or a different color, indicate when data was added by the user. Alternatively, no such indication may be given.

The list of voicemails 520 may further include folders 530. Messages may be filed in multiple folders 534. The user may establish nested folders, to organize stored messages. For one embodiment, the user may store voicemail messages separately from other types of messages, such as e-mail, fax, photographs, or documents.

The user interface 510 may further include other personal information 590. The other personal information 590 may include other documents stored in the data storage. For example, the user may store text documents, BLOBs, faxes, images, video, or other information in the data storage. For one embodiment, the personal information 590 may further include a link to other sites. This area may be configured by the user, or generated automatically by the user interface of the UCVMS.

The user interface 510 may further include an advertising banner 595. For one embodiment, the advertising banner 595 content may be tailored to the user, as is known in the art. For one embodiment, multiple advertising banners 595 may be displayed.

In the foregoing specification, the invention has been described with reference to specific exemplary embodiments thereof. Specifically, the above description refers to messages or voicemail messages. However, it is understood that the above description may be extended to include other types of data, such as faxes, e-mail messages, documents, video, etc. It is evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A user controlled voicemail management system comprising:

means for receiving data packets carrying a voicemail message forwarded by a third-party voicemail service provider pursuant to a command of a user, said command being executed within said voicemail service provider's system, said data packets comprising the user's identification information, the user's identification information comprising the user's telephone number and the user's voicemail password registered with said voicemail service provider, said data packets being encrypted in such a manner that only the user being authenticated by said voicemail management system can access said voicemail message;

at least one database for storing received voicemail messages user's information, and other data:

means for prompting the user to open an account when said voicemail management system receives a voicemail message but fails to locate an existing account for the user; and a user interface which allows the user to perform management operations on the user's account over a computer based network;

wherein said user interface is communicatively coupled to;

means for authenticating the user to access said voicemail management system, said authentication means using said telephone number and said voicemail password as the user's default authentication identification for accessing said voicemail management system;

means for enabling the user to configure display of said user interface;

means for means for automatically generating a profile for each received voicemail message and storing said generated profile in said at least one database, wherein each generated profile comprises a number of searchable parameters and a link to its corresponding voicemail message; and means for enabling the user to store a copy of any electronic document in the user's account;

wherein said management operations comprise any of:

searching a voicemail message or an electronic document;

retrieving a voicemail message or an electronic document;

deleting a voicemail message or an electronic document;

filing voicemail messages or electronic documents in folders;

configuring profile layout;

adding a note into a profile;

attaching a stored voicemail message or/and a stored electronic document to an outbound electronic mall; and attaching a profile link of a stored voicemail message or a stored electronic document to an outbound electronic mail.

2. The system of claim 1, wherein said profile of said received voicemail message comprises one or more fields for displaying information on a caller's identification and telephone number, time and date of said voicemail message, length of voicemail message, time and date of storage, and the user's notes added via said user interface.

3. The system of claim 1, wherein said command can be any of:

manual operation of key pressing to initiate forwarding a new voicemail message to said voicemail management system; and automatic forwarding any new voicemail message based on the user's preset preferences.

4. In a computer network based voicemail management system, a method for archiving users' voicemail messages, comprising the steps of:

(a) receiving a voicemail message forwarded pursuant to a user's command by a third-party voicemail service provider, said voicemail message comprising the user's identification information, wherein, the user's identification information comprising the user's telephone number and the user's voicemail password registered with said voicemail service provider;

(b) storing said received voicemail message in a data storage which comprises at least one database;

(c) checking whether the user has an account with said voicemail management system;

(d) if the check result in step (c) is yes, continuing on step (f);

(e) if the check result in step (c) is no, prompting the user to open an account with said voicemail management system;

(f) upon confirmation of the user's account, generating a profile for said received voicemail message, said profile comprising a number of searchable parameters and a link to said received voicemail message;

(g) storing said profile in said data storage;

(h) adding said received voicemail message and said profile to user's account; and (i) responding to the user's query via a user interface which allows the user to log in said voicemail management system and to perform management operations on the user's account over the computer network;

wherein the user logs in said voicemail management system by entering the user's telephone number and the user's voicemail password registered with said voicemail service provider; and wherein said management operations comprise any of:

searching a voicemail message;

retrieving a voicemail message;

deleting a voicemail message;

organizing voicemail messages in folders;

configuring profile layout;

adding a note into a profile;

attaching a stored voicemail message to an outbound electronic mail; and attaching a profile link of a stored voicemail message to an outbound electronic mail.

5. The method of claim 4, wherein said profile of said received voicemail message comprises one or more fields for displaying information on a caller's identification, telephone number, time and date of said voicemail message, length of voicemail message, time and date of storage, and the user's notes added via said user interface.

* * * * *